United States Patent
Ando et al.

(10) Patent No.: US 9,990,072 B2
(45) Date of Patent: Jun. 5, 2018

(54) DISPLAY PANEL WITH PRESSURE SENSOR AND ELECTRONIC DEVICE WITH PRESSING INPUT FUNCTION

(71) Applicants: Murata Manufacturing Co., Ltd., Nagaokakyo-shi, Kyoto-fu (JP); Mitsui Chemicals, Inc., Minato-ku, Tokyo (JP)

(72) Inventors: Masamichi Ando, Nagaokakyo (JP); Jun Endo, Nagaokakyo (JP); Hideki Kawamura, Nagaokakyo (JP)

(73) Assignees: MURATA MANUFACTURING CO., LTD., Nagakakyo-Shi, Kyoto-Fu (JP); MITSUI CHEMICALS, INC., Minato-Ku, Tokyo (JP)

( * ) Notice: Subject to any disclaimer, the term of this patent is extended or adjusted under 35 U.S.C. 154(b) by 88 days.

(21) Appl. No.: 14/813,247

(22) Filed: Jul. 30, 2015

(65) Prior Publication Data

US 2015/0338981 A1   Nov. 26, 2015

Related U.S. Application Data

(63) Continuation of application No. PCT/JP2014/051457, filed on Jan. 24, 2014.

(30) Foreign Application Priority Data

Feb. 1, 2013   (JP) .................................. 2013-018770

(51) Int. Cl.
   *G06F 3/041*   (2006.01)
   *G02F 1/1335*   (2006.01)
   (Continued)

(52) U.S. Cl.
   CPC ........ *G06F 3/0414* (2013.01); *G02F 1/13338* (2013.01); *G02F 1/13363* (2013.01);
   (Continued)

(58) Field of Classification Search
   CPC ............... G06F 3/0414; G02F 1/13363; G02F 1/133528; G02F 1/13338; G02B 5/30; G02B 5/3083; G01L 1/16
   See application file for complete search history.

(56) References Cited

U.S. PATENT DOCUMENTS

| | | | |
|---|---|---|---|
| 2007/0069251 A1 | 3/2007 | Matsumoto et al. | |
| 2009/0046072 A1* | 2/2009 | Emig ...................... | G06F 3/044 345/173 |

(Continued)

FOREIGN PATENT DOCUMENTS

| | | |
|---|---|---|
| EP | 1 103 885 A1 | 5/2001 |
| JP | 2007-086959 A | 4/2007 |

(Continued)

OTHER PUBLICATIONS

International Search Report issued for PCT/JP2014/051457, dated Apr. 22, 2014.

(Continued)

*Primary Examiner* — Christopher E Leiby
(74) *Attorney, Agent, or Firm* — Arent Fox LLP

(57) ABSTRACT

An electronic device with pressing input function includes a substantially rectangular parallelepiped-shaped housing. A pressure sensor, a display panel, a protective member, and an arithmetic circuit module are disposed in the housing. In the display panel, a front polarizing plate is disposed on a front face of a liquid crystal panel. The pressure sensor includes piezoelectric films having birefringence, and electrodes formed on opposed faces of one of the piezoelectric films. The pressure sensor is disposed between the liquid crystal panel and the front polarizing plate. The piezoelectric films are arranged such that their uniaxial drawing directions are orthogonal to each other.

10 Claims, 8 Drawing Sheets

(51) Int. Cl.
*G02F 1/13363* (2006.01)
*G02F 1/1333* (2006.01)
*G02B 5/30* (2006.01)

(52) U.S. Cl.
CPC .......... *G02F 1/133528* (2013.01); *G02B 5/30* (2013.01); *G02B 5/3083* (2013.01)

(56) References Cited

U.S. PATENT DOCUMENTS

| | | | | |
|---|---|---|---|---|
| 2009/0225057 | A1* | 9/2009 | Polak | G02F 1/133536 345/173 |
| 2010/0013785 | A1* | 1/2010 | Murai | G06F 3/047 345/173 |
| 2010/0103115 | A1* | 4/2010 | Hainzl | G06F 3/0414 345/173 |
| 2010/0110035 | A1* | 5/2010 | Selker | G09G 5/003 345/174 |
| 2010/0156841 | A1* | 6/2010 | Wang | G06F 3/0414 345/174 |
| 2010/0182252 | A1 | 7/2010 | Jeong | |
| 2010/0289771 | A1* | 11/2010 | Nozawa | G06F 3/045 345/174 |
| 2011/0109204 | A1* | 5/2011 | Tajitsu | H01L 41/193 310/348 |
| 2012/0050201 | A1* | 3/2012 | Nozawa | G06F 3/0416 345/173 |
| 2012/0117769 | A1* | 5/2012 | Ohnishi | H01L 41/257 29/25.35 |
| 2012/0127136 | A1* | 5/2012 | Schneider | G02F 1/13718 345/204 |
| 2012/0132846 | A1* | 5/2012 | Yoshida | H01L 41/45 252/62.9 R |
| 2013/0076649 | A1* | 3/2013 | Myers | H04M 1/0268 345/173 |
| 2013/0082970 | A1* | 4/2013 | Frey | G06F 3/0414 345/173 |
| 2013/0108061 | A1* | 5/2013 | Ando | G06F 3/0433 381/55 |
| 2013/0278545 | A1* | 10/2013 | Cok | G06F 3/044 345/174 |
| 2014/0084204 | A1* | 3/2014 | Tanimoto | C08J 5/18 252/62.9 R |
| 2015/0247765 | A1* | 9/2015 | Ando | G06F 3/0414 310/331 |

FOREIGN PATENT DOCUMENTS

| | | |
|---|---|---|
| JP | 2012-214056 A | 11/2012 |
| JP | 2012-230667 A | 11/2012 |
| WO | WO 2011/125408 A1 | 10/2011 |

OTHER PUBLICATIONS

Written Opinion of the International Searching Authority issued for PCT/JP2014/051457, dated Apr. 22, 2014.

Masamichi Ando et al.; Film Sensor Device Fabricated by a Piezoelectric Poly(L-lactic-acid) Film; Japanese Journal of Applied Physics, vol. 51, Sep. 1, 2012, p. 09LD14.

Masamichi Ando et al.; New Human Machine Interface Devices Using a Piezoelectric Poly(L-lactic acid) Film; 2013 Joint IEEE International Symposium on Applications of Ferroelectric and Workshop on Piezoresponse Force Microscopy, IEEE Jul. 21, 2013, pp. 236-239.

Murata Manufacturing Co. Ltd.; "Special Report Latest Sensor Trends Organic Piezoelectric Film Reshapes Sensor Features"; May 1, 2012, Retrieved from Internet: URL: http:/www.murata.com/~/media/webrenewal/about/newsroom/tech/others/falld4.ashx, retrieved on Jul. 13, 2016, p. 17-18.

* cited by examiner

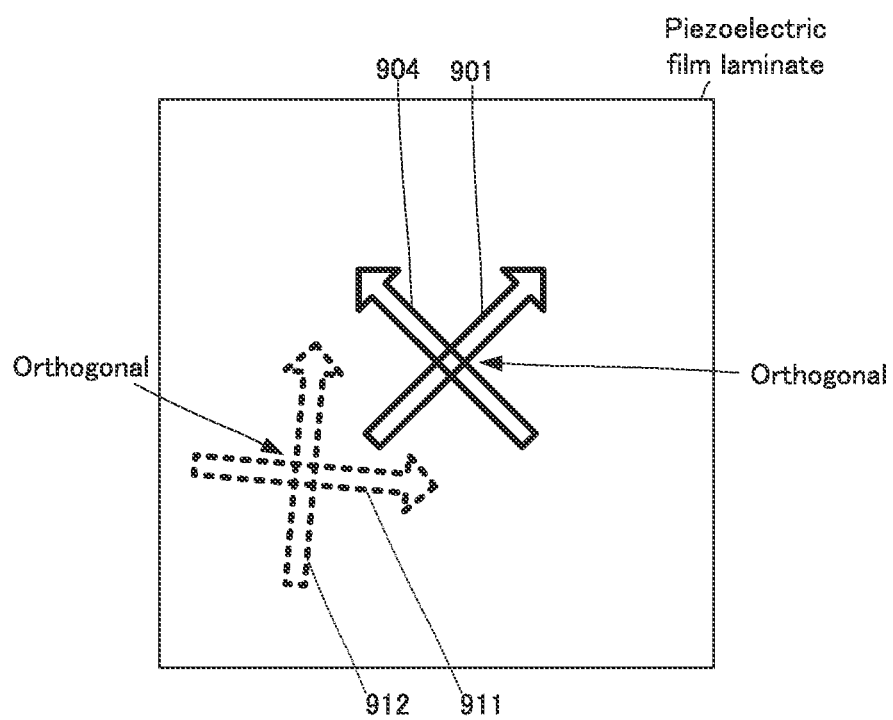

DISPLAY PANEL WITH PRESSURE SENSOR AND ELECTRONIC DEVICE WITH PRESSING INPUT FUNCTION

CROSS REFERENCE TO RELATED APPLICATIONS

The present application is a continuation of International application No. PCT/JP2014/051457, filed Jan. 24, 2014, which claims priority to Japanese Patent Application No. 2013-018770, filed Feb. 1, 2013, the entire contents of each of which are incorporated herein by reference.

FIELD OF THE INVENTION

The present invention relates to a display panel with pressure sensor capable of performing a pressing operational input by touching a display screen with a finger or the like, and an electronic device with pressing input function provided with the display panel with pressure sensor.

BACKGROUND OF THE INVENTION

Various electronic devices provided with a thin display panel such as a liquid crystal display capable of receiving an operational input on its display surface have been proposed. For example, Patent Literature 1 discloses an electronic device with a touch sensor for detecting an operational position, which is disposed on a front face of a display panel. When an operator touches an operation surface, the touch sensor detects a touch position. The electronic device executes processing according to the operational position.

In the case where such conventional electronic device with touch sensor includes a display panel requiring a polarizing plate such as a liquid crystal panel, components constituting the electronic device are disposed as follows.

A front polarizing plate is disposed on the operation surface (outermost face). A touch panel is disposed on the opposite side of the front polarizing plate to the operation surface. A liquid crystal panel formed of a pair of glasses that sandwiches liquid crystal therebetween is disposed on the opposite side of the touch panel to the front polarizing plate. A rear polarizing plate is disposed on the opposite side of the touch panel to the liquid crystal panel. That is, the touch panel is disposed between the front polarizing plate and the rear polarizing plate.

With the above-mentioned structure, in the case of a transmission liquid crystal display, light from a backlight disposed on the rear face of the rear polarizing plate penetrates the rear polarizing plate, the liquid crystal panel, the touch sensor, and the front polarizing plate in this order, and then, is emitted to the operation surface. In the case of a reflection liquid crystal display, for example, a reflective plate is provided in place of the rear polarizing plate, and light incident from the operation surface penetrates the front polarizing plate, the touch sensor, the liquid crystal panel, the reflective plate, the liquid crystal panel, the touch sensor, and the front polarizing plate in this order, and then, returns to the operation surface.

Using the property of transmitting only a wave (light wave) vibrating in a certain direction, the front polarizing plate and the rear polarizing plate are combined with the liquid crystal panel to set contrast and transmittance to respective predetermined values, and improve appearance.

Patent Literature 1—Japanese Patent Unexamined Publication No. 2012-230657 bulletin

SUMMARY OF THE INVENTION

However, the above-mentioned conventional electronic device with the thin display panel has a following problem.

Currently, a pressure sensor is configured of a piezoelectric element formed of a chiral polymer to detect a pressing amount. However, the piezoelectric element formed of the chiral polymer has birefringence. For example, the refractive index of a wave vibrating in a direction parallel to the drawing direction of the uniaxially drawn L-type polylactic acid (PLLA) is 1.47. The refractive index of a wave vibrating in a direction vertical to the drawing direction of the uniaxially drawn L-type polylactic acid (PLLA) is 1.45. This is the retardation property.

In incorporating such pressure sensor having birefringence into the above-mentioned thin display panel, when the display panel is disposed between the front polarizing plate and the rear polarizing plate for the transmission-type, or the display panel is disposed between two front polarizing plates along the light guiding direction for the reflection-type, a target color disadvantageously changes, failing to acquire a desired image color.

Thus, an object of the present invention is to provide a display panel with pressure sensor capable of reproducing a desired color in a display panel capable of detecting the pressing amount by using a piezoelectric element formed of a chiral polymer.

The display panel with pressure sensor according the present invention is characterized by following configuration. The display panel with pressure sensor includes a display panel, a pressure sensor, and a phase compensating film. The display panel includes an image forming panel for controlling light emitted to a front face side to form a displayed image, and a front polarizing plate disposed on the front face side of the image forming panel. The pressure sensor has a piezoelectric film formed of a chiral polymer.

With this configuration, birefringence of the piezoelectric film is compensated and cancelled with birefringence of the phase compensating film. Thus, light emitted from the image forming panel is displayed without causing any phase difference due to direction.

In the display panel with pressure sensor according to the present invention, preferably, both the pressure sensor and the phase compensating film are disposed between the image forming panel and the front polarizing plate.

Even with such arrangement, because birefringence of the piezoelectric film is compensated and cancelled with birefringence of the phase compensating film, light emitted from the image forming panel reaches the front polarizing plate without causing any phase difference due to direction.

In the display panel with pressure sensor according to the present invention, preferably, the chiral polymer forming the piezoelectric film is polylactic acid, and the polylactic acid is at least uniaxially drawn.

This configuration shows the preferable aspect of piezoelectric film. The use of the polylactic acid can achieve the display panel with pressure sensor having a good translucency and a high pressure-detection sensitivity.

In the display panel with pressure sensor according to the present invention, preferably, the phase compensating film has a phase difference opposite to a phase difference of the piezoelectric film of the pressure sensor.

With this configuration, birefringence of the piezoelectric film can be effectively compensated with the phase compensating film, further reducing the phase difference due to direction.

In the display panel with pressure sensor according to the present invention, preferably, the phase compensating film is at least uniaxially drawn polylactic acid, and an uniaxial drawing direction of the piezoelectric film is orthogonal to an uniaxial drawing direction of the phase compensating film.

This configuration shows the preferable aspect of phase compensating film. This configuration can cancel birefringence of the piezoelectric film made of polylactic acid more reliably to achieve a display panel with pressure sensor having a good translucency.

In the display panel with pressure sensor according to the present invention, the phase compensating film may have a position-detecting sensor function of detecting a touch position.

With this configuration, position as well as pressure can be detected.

In the display panel with pressure sensor according to the present invention, preferably, the pressure sensor has a position-detecting sensor function of detecting a touch position.

With this configuration, the pressure sensor is integrally formed with the position-detecting sensor. This can make the display panel with pressure sensor having the operational position detecting function thinner.

The present invention relates to an electronic device with pressing input function, and has a following feature. The electronic device with pressing input function includes the display panel with pressure sensor according to any one of the above-mentioned aspects, an arithmetic unit for detecting a pressing amount based on a detection signal from the pressure sensor, and a housing that is opened to a display surface and stores the display panel with pressure sensor and the arithmetic unit.

With this configuration, despite of the pressure sensor including the piezoelectric film having birefringence, the operator can visually recognize the color of light emitted through the display panel and the front polarizing plate while keeping the color.

According to the present invention, even the display panel including the pressure sensor having birefringence can reproduce a desired color.

BRIEF DESCRIPTION OF THE DRAWINGS

FIG. 8 is a view illustrating relationship between drawing directions in the state four piezoelectric films are stacked (overlapped).

DETAILED DESCRIPTION OF THE PREFERRED EMBODIMENTS

Figure 1:
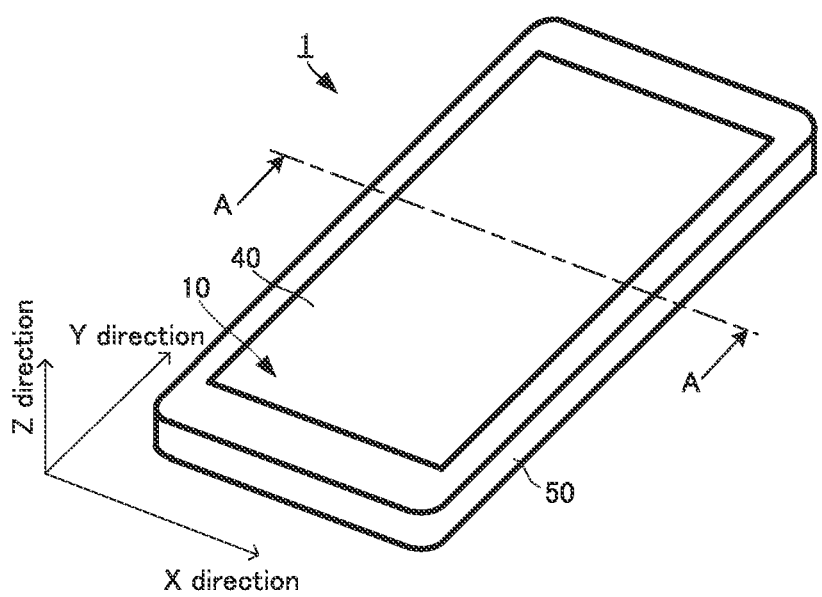
FIG. 1 is an external perspective view of an electronic device with pressing input function in accordance with a first embodiment of the present invention.
Figure 2:
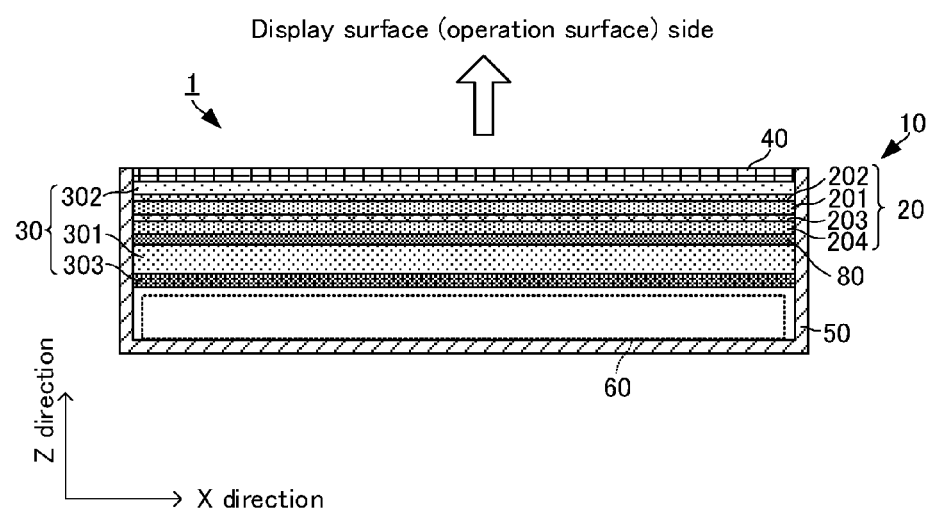
FIG. 2 is a sectional view illustrating the electronic device with pressing input function in accordance with the first embodiment of the present invention.
Figure 3A:
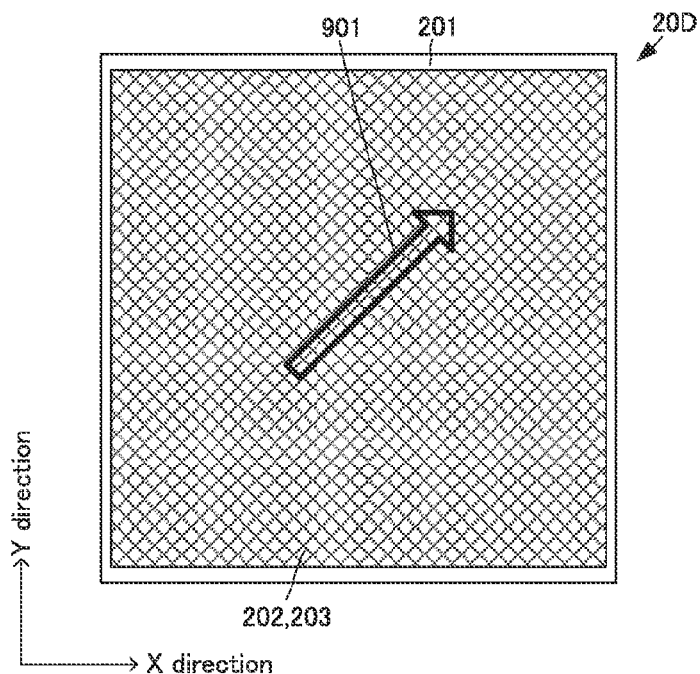
FIGS. 3A and 3B are exploded plan views illustrating a pressure sensor in accordance with the first embodiment of the present invention.
Figure 3B:
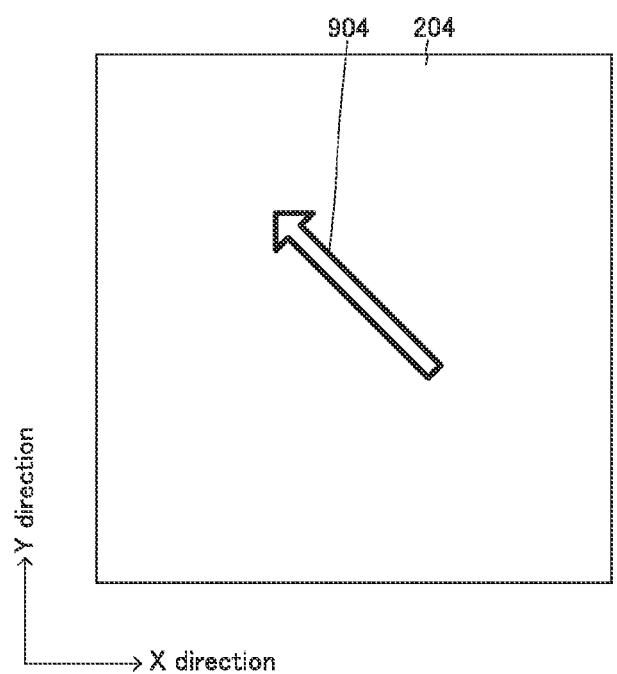

An electronic device with pressing input function and a display panel with pressure sensor provided in the electronic device in accordance with a first embodiment of the present invention will be described below with reference to the drawings. FIG. 1 is an external perspective view of an electronic device with pressing input function in accordance with the first embodiment of the present invention. FIG. 2 is a sectional view illustrating the electronic device with pressing input function in accordance with the first embodiment of the present invention. FIGS. 3A and 3B are exploded plan views illustrating a pressure sensor in accordance with the first embodiment of the present invention.

As illustrated in FIG. 1, an electronic device with pressing input function 1 includes a substantially rectangular parallelepiped-shaped housing 50. A front face side of the housing 50 is opened. Hereinafter, a widthwise direction (horizontal direction) of the housing 50 is defined as an X direction, a lengthwise direction (vertical direction) as a Y direction, a thickness direction as a Z direction. In this embodiment, a length of the housing 50 in the X direction is smaller than a length of the housing 50 in the Y direction. However, the length in the X direction may be the same as the length in the Y direction, or the length in the X direction may be larger than the length in the Y direction.

As illustrated in FIG. 2, a display panel with pressure sensor 10, a protective member 40, and an arithmetic circuit module 60 are disposed in the housing 50. The protective member 40, the display panel with pressure sensor 10, and the arithmetic circuit module 60 are arranged along the Z direction in this order from the opened face (display surface) of the housing 50. The display panel with pressure sensor 10 includes a pressure sensor 20 and a display panel 30.

As illustrated in FIG. 2, the pressure sensor 20 includes a flat film-like piezoelectric film 201 and electrodes 202, 203. The electrodes 202, 203 are disposed on both flat plate faces (principal faces) of the piezoelectric film 201. The electrodes 202, 203 are formed on the substantially entire flat plate faces of the piezoelectric film 201.

A piezoelectric film 204 is disposed on the piezoelectric film 201 on the opposite side to the electrode 203.

The piezoelectric films 201, 204 each are a film formed of a chiral polymer. In this embodiment, polylactic acid (PLA), in particular, L-type polylactic acid (PLLA) is used as the chiral polymer. The PLLA is uniaxially drawn.

The PLLA formed of the chiral polymer has a spiral principal chain. When the PLLA is uniaxially drawn, its molecules are oriented, providing a piezoelectric property. By pressing the flat plate face of the piezoelectric film, the uniaxially drawn PLLA produces electric charge. The amount of electric charge generated at this time is uniquely determined depending on the displacement of the flat plate face in the direction orthogonal to the flat plate face due to pressing.

The piezoelectric constant of the uniaxially drawn PLLA is extremely high in polymers. Consequently, displacement caused by pressing and relief of pressing can be detected at a high sensitivity.

The draw ratio is preferably, about 3 to 8 times. Thermal treatment after drawing promotes crystallization of the drawn chain of the polylactic acid to improve the piezoelectric constant. It is noted that biaxial drawing can achieve the same effect as that of uniaxial drawing by making the draw ratio of the axes different. In this embodiment, such mode is also referred to as uniaxial drawing. For example, in the case of biaxially drawing the film 8 times in an X-axis direction and twice in a Y-axis direction orthogonal to the X-axis direction, the substantially same piezoelectric constant can be acquired as in the case of uniaxially drawing 4 times in the X-axis direction. Because the uniaxially drawn film tends to tear in the drawing axis direction, the biaxial drawing can somewhat increase the strength of the film.

Because the PLLA exhibits the piezoelectric property by molecule orientation processing such as drawing, unlike other polymers such as PVDF and piezoelectric ceramics, polling is not required. That is, the piezoelectric property of the PLLA as a non-ferroelectric substance is not produced by ion polarization as in ferroelectric substances such as PVDF and PZT, and is derived from its characteristic spiral structure of molecules. For this reason, the PLLA does not provide pyroelectricity generated in other ferroelectric piezoelectric substances. Further, the piezoelectric constant of the PVDF varies with time, and may be greatly decreased in some cases, while the piezoelectric constant of the PLLA does not change with time. Thus, displacement caused by pressing and relief of pressing can be detected at a high sensitivity irrespective ambient environment.

Further, the PLLA has a very low relative permittivity of about 2.5 and thus, given that d is piezoelectric constant and $\in^T$ is dielectric constant, a piezoelectric output constant (=piezoelectric g constant, $g=d/\in^T$) becomes large. The piezoelectric g constant of the PVDF having a dielectric constant $\in_{33}^T=13\times\in_0$ and a piezoelectric constant $d_{31}=25$ pC/N becomes $g_{31}=0.2172$ Vm/N according to the above-mentioned equation. When converting the piezoelectric g constant of the PLLA having a piezoelectric constant $d_{14}=10$ pC/N into $g_{31}$, due to $d_{14}=2\times d_{31}$, $d_{31}=5$ pC/N, and the piezoelectric g constant becomes $g_{31}=0.2258$ Vm/N. Therefore, the PLLA having the piezoelectric constant $d_{14}=10$ pC/N can achieve the same detection sensitivity of the pressing amount as that of the PVDF. The Inventors of the present invention experimentally obtains the PLLA having $d_{14}=15$ to 20 pC/N, and by using the PLLA, pressing and relief of pressing can be detected at a higher sensitivity.

The uniaxially drawn PLLA has birefringence. Specifically, molecules of the PLLA are oriented in the drawing direction, and the refractive index of the PLLA varies depending on the orienting direction and the direction orthogonal to the orienting direction (the direction orthogonal to the drawing direction). Specifically, the refractive index in the drawing direction (orienting direction) is about 1.47, and the refractive index in the direction orthogonal to the drawing direction (orienting direction) is about 1.45. Consequently, the piezoelectric films 201, 204 each are a retardation.

Preferably, the electrodes 202, 203 each are an inorganic electrode such as ITO, ZnO, silver nanowire, carbon nanotube, graphene, or the like, or an organic electrode including polythiophene, polyaniline, and the like as a main ingredient. Such material enables formation of a highly translucent conductive pattern. By providing the electrodes 202, 203, electric charge generated from the piezoelectric film 201 can be acquired as a potential difference, and a piezoelectric detection signal having a voltage value corresponding to the pressing amount can be outputted to the outside. The piezoelectric detection signal is outputted to the arithmetic circuit module 60 via a wire not shown. The arithmetic circuit module calculates the pressing amount based on the piezoelectric detection signal.

As illustrated in FIGS. 3A and 3B, the piezoelectric film 201, 204 is shaped like a rectangle extending in the X direction and the Y direction that are orthogonal to each other. A uniaxial drawing direction 901 of the piezoelectric film 201 forms about 45 degrees with respect to the X direction and the Y direction. A uniaxial drawing direction 904 of the piezoelectric film 204 also forms about 45 degrees with respect to the X direction and the Y direction. However, the piezoelectric film 204 is arranged such that the uniaxial drawing direction 904 is orthogonal to the uniaxial drawing direction 901.

With such configuration, birefringence of the piezoelectric film 201 is compensated with birefringence of the piezoelectric film 204. In other words, birefringence of the piezoelectric film 201 is cancelled with birefringence of the piezoelectric film 204. That is, the piezoelectric film 204 functions as a phase compensating film that has a phase difference opposite to a phase difference of the piezoelectric film 201. Consequently, a light wave incident from one principal face of the pressure sensor 20 is emitted from the other principal face in the state where phases in all directions are aligned.

As illustrated in FIG. 2, the display panel 30 includes a flat plate-like liquid crystal panel 301 (corresponding to "image forming panel" of the present invention), a front polarizing plate 302, and a rear reflective plate 303. The liquid crystal panel 301 changes its orientation of liquid crystal to form a predetermined image pattern by application of a driving electrode from the outside. The front polarizing plate 302 allows only the light wave vibrating in a predetermined direction to transmit. The rear reflective plate 303 reflects light from the liquid crystal panel 301 toward the liquid crystal panel 301. In the display panel 30 with such configuration, light from the display surface penetrates the front polarizing plate 302 and the liquid crystal panel 301, reaches the rear reflective plate 303, is reflected on the rear reflective plate 303, and is emitted to the display surface through the liquid crystal panel 301 and the front polarizing plate 302. At this time, through control of the polarizing property of the front polarizing plate 302 and the polarization due to orientation state of liquid crystal, the display panel 30 forms a desired displayed image using the light emitted to the display surface.

With respect to the display panel 30, the pressure sensor 20 is disposed between the liquid crystal panel 301 and the front polarizing plate 302. The pressure sensor 20 cancels birefringence of the piezoelectric film 201 with birefringence of the piezoelectric film 204 and thus, has no birefringence.

Consequently, even in the case of disposing the pressure sensor 20 between the liquid crystal panel 301 and the front polarizing plate 302, the same color as that in the absence of the pressure sensor 20 can be reproduced.

The protective member 40 is formed of a flat plate with insulation properties and translucency. Further, the protective member 40 has preferably a high resistance to external environment. For example, the protective member 40 is made of glass. In addition, the protective member 40 has preferably a predetermined elasticity.

With the display panel with pressure sensor 10 and the electronic device with pressing input function 1 having such configuration, the operator can view a display screen according to a following principle. Light incident from the display surface (operation surface) of the housing 50 enters into the pressure sensor 20 through the protective member 40 and the front side polarizing plate 302. The light penetrating the pressure sensor 20 enters into the liquid crystal panel 301 without being changed in polarizing property by the pressure sensor 20. The light penetrates the liquid crystal panel 301, is reflected on the rear reflective plate 303, penetrates the liquid crystal panel 301 again, and enters into the pressure sensor 20. The light is emitted from the pressure sensor 20 without any change of polarizing property, and is emitted toward the operator through the front polarizing plate 302 and the protective member 40. At this time, by means of control of the liquid crystal panel 301 and polarization of the front polarizing plate 302, a predetermined displayed image is provided to the operator. In this embodiment, even the display panel with pressure sensor 10 including the pressure sensor having the piezoelectric film formed of the chiral polymer can reproduce the same color as that in the absence of the pressure sensor.

Although the phase compensating piezoelectric film 204 is disposed on the piezoelectric film 201 on the side of the liquid crystal panel 301 in the embodiment, the phase compensating piezoelectric film 204 may be disposed on the piezoelectric film 201 on the side of the front polarizing plate 302.

The angle of the uniaxial drawing direction of the piezoelectric films 201, 204 in the embodiment is an example and is determined according to design. However, it is preferred that the uniaxial drawing direction 901 of the piezoelectric film 201 forms 45 degrees with respect to the direction of a stress caused when the protective member 40 is pressed.

Although the pressure sensor 20 contacts the liquid crystal panel 301 in the embodiment, the pressure sensor 20 and the liquid crystal panel 301 may have a gap or a flexible buffer member 80 therebetween. With this configuration, even when pushed and curved, the pressure sensor 20 never contacts the liquid crystal panel 301. Consequently, pressing of the pressure sensor 20 is not limited, detection of the pressing amount is performed at high accuracy. Because the configuration including the buffer member 80 has a large operation surface, even when the pressure sensor 20 becomes large, the flat plate face can be kept flat, and does not obstruct the pressure sensor 20 from bending due to pressing.

Although the phase compensating piezoelectric film 204 is provided in the embodiment, a phase difference film may be provided in place of the piezoelectric film 204. Like the piezoelectric film 204, the phase difference film may have birefringence that compensates and cancels birefringence of the piezoelectric film 201. The phase difference film may have a low elasticity to function as a buffer member. Although the electrodes 202, 203 are formed on the face of the piezoelectric film 204, the electrodes 202, 203 may be formed on the phase difference film and contact the piezoelectric film 204.

Figure 4:
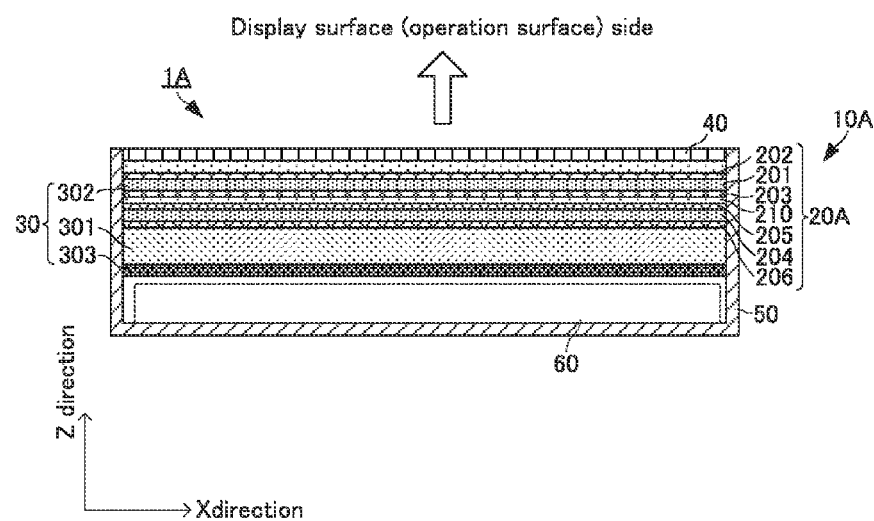
FIG. 4 is a sectional view illustrating an electronic device with pressing input function in accordance with a second embodiment of the present invention.

A display panel with pressure sensor in accordance with a second embodiment of the present invention will be described with reference to the drawing. The basic structure (contour and so on) of the electronic device with pressing input function 1A in this embodiment is the same as that of the electronic device with pressing input function 1 in the first embodiment except that a pressure sensor 20A is different from the pressure sensor in the first embodiment. Consequently, only the difference will be specifically described below. FIG. 4 is a sectional view of an electronic device with pressing input function in accordance with the second embodiment of the present invention.

The pressure sensor 20A of the display panel with pressure sensor 10A includes an electrode 205, a piezoelectric film 204, and an electrode 206 on the electrode 203 on the opposite side to the piezoelectric film 201 via an intermediate member 210. The intermediate member 210 is translucent, adhesive, and viscous. Like the piezoelectric film 201, the piezoelectric film 204 is made of the chiral polymer, here, PLLA. The piezoelectric film 204 is also uniaxially drawn. The electrodes 205, 206 are formed on both flat plate faces of the piezoelectric film 204. The electrodes 205, 206 are made of a translucent material. That is, in this embodiment, the piezoelectric film 204 that is a phase compensating film also functions as a pressure sensor.

As in the embodiments, the piezoelectric film 204 is arranged such that the drawing direction 901 of the piezoelectric film 201 is substantially orthogonal to the drawing direction 904 of the piezoelectric film 204. With such configuration, birefringence of the piezoelectric film 201 can be compensated with birefringence of the piezoelectric film 204, cancelling the effect of birefringence on the light wave penetrating the films.

Even with such configuration, as in each of the embodiments, the display panel can offer a desired color to the operator.

The configuration in this embodiment uses a first piezoelectric detection signal from the piezoelectric film 201 and the electrodes 202, 203, and a second piezoelectric detection signal from the piezoelectric film 204 and the electrodes 205, 206 to detect the pressing amount. Consequently, the amplitude to the pressing amount can be increased by adding the amplitude of the first piezoelectric detection signal and the amplitude of the second piezoelectric detection signal so as not to cancel the amplitudes with each other. This can improve the sensitivity to the pressing amount.

Figure 5:
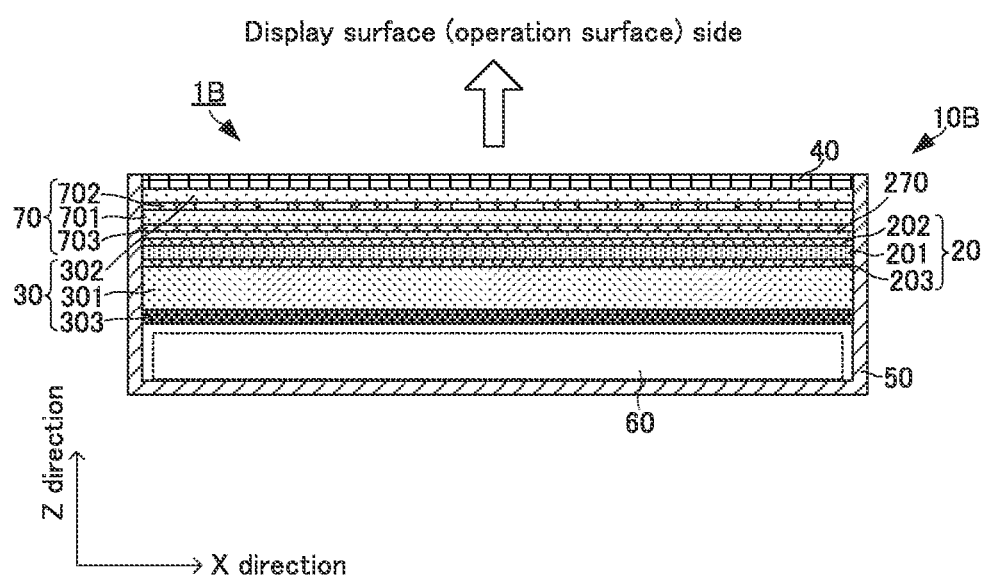
FIG. 5 is a sectional view illustrating a display panel with pressure sensor in accordance with a third embodiment of the present invention.
Figure 6A:
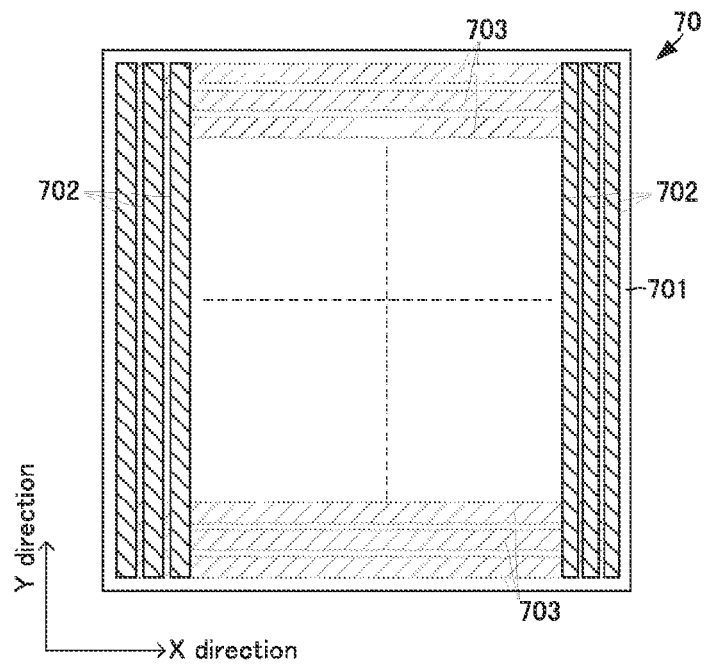
FIGS. 6A and 6B are plan views illustrating a pressure sensor and a position detecting sensor in accordance with the third embodiment of the present invention.
Figure 6B:
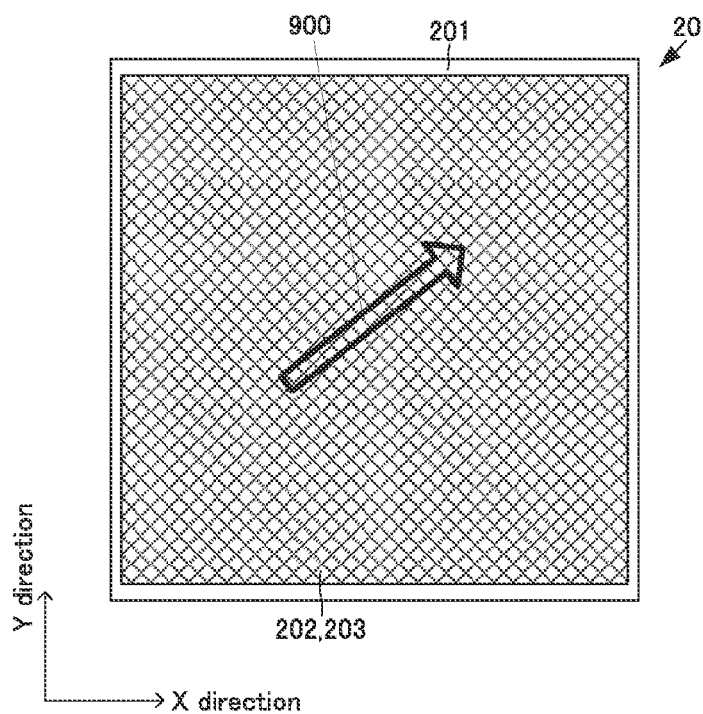

A display panel with pressure sensor in accordance with a third embodiment of the present invention will be described below with reference to the drawings. The basic structure (contour and so on) of the electronic device with pressing input function 1B in this embodiment is the same as that of the electronic device with pressing input function 1 in the first embodiment except for the structure of a display panel with pressure sensor 10B. Accordingly, only the difference between the display panel 10B and the display panel with pressure sensor 10 in the first embodiment will be specifically described below. FIG. 5 is a sectional view illustrating the display panel with pressure sensor in accordance with the third embodiment of the present invention. FIGS. 6A and 6B are plan views illustrating a pressure sensor and a position detecting sensor in accordance with the third embodiment of the present invention.

As illustrated in FIG. 5, the display panel with pressure sensor 10B in this embodiment includes a position detecting sensor 70. The position detecting sensor 70 and the pressure sensor 20 are disposed between the front polarizing plate 302 and the liquid crystal panel 301. The position detecting sensor 70 is disposed closer to the front polarizing plate 302 than the pressure sensor 20. An intermediate member 270 is disposed between the position detecting sensor 70 and the pressure sensor 20. The intermediate member 270 has insulation properties, translucency, and, adhesiveness or viscosity.

The position detecting sensor 70 includes a flat plate-like insulating substrate 701 and a plurality of electrodes 702, 703. The insulating substrate 701 is made of a translucent material.

As illustrated in FIG. 6A, the plurality of electrodes 702 are formed on one flat plate face of the insulating substrate 701. The plurality of electrodes 702 are long, and the longitudinal direction corresponds to the Y direction. The plurality of electrodes 702 are spaced in the X direction. The plurality of electrodes 703 are formed on the other flat plate face of the insulating substrate 701. The plurality of electrodes 703 are long, and the longitudinal direction corresponds to the X direction. The plurality of electrodes 703 are spaced in the Y direction. Like the electrodes 202, 203 of the pressure sensor 20, the plurality of electrodes 702, 703 are made of a translucent material.

The position detecting sensor 70 detects a change of capacitance, which is caused when a finger of the operator comes close, with the electrodes 702, 703, and outputs a capacitance detection signal to the arithmetic circuit module 60. The arithmetic circuit module 60 detects the operational position based on the combination of the electrodes 702, 703 that detects the capacitance detection signal.

In the position detecting sensor 70, the insulating substrate 701 has birefringence. The position detecting sensor 70 is formed such that birefringence of the insulating substrate 701 compensates and cancels birefringence of the piezoelectric film 201.

With such configuration, as in the first embodiment, a desired color displayed in the display panel can be offered to the operator. Further, the configuration in this embodiment enables detection of the operational position as well as the pressing amount.

The insulating substrate 701 of the position detecting sensor 70 may be made of a material without birefringence, and the phase compensating piezoelectric film 204 may be disposed as in the first embodiment. However, because the configuration in this embodiment can eliminate the phase compensating piezoelectric film, the display panel with pressure sensor 10B can be made thinner.

The position detecting sensor 70 may be provided on the pressure sensor 20 on the side of the liquid crystal panel 301.

Figure 7:
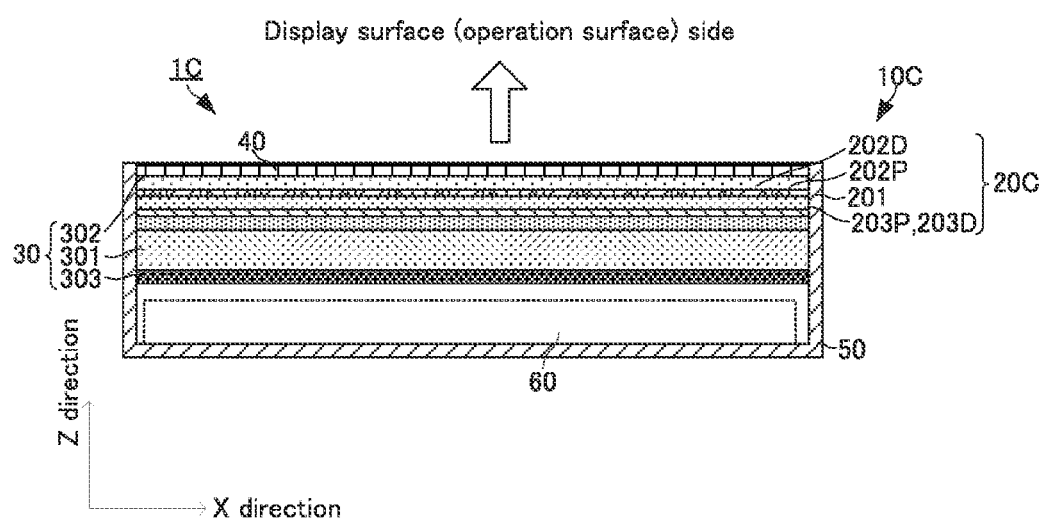
FIG. 7 is a sectional view illustrating a display panel with pressure sensor in accordance with a fourth embodiment of the present invention.

A display panel with pressure sensor in accordance with a fourth embodiment of the present invention will be described below with reference to the drawing. The basic structure (contour and so on) of the electronic device with pressing input function 1C in this embodiment is the same as that of the electronic device with pressing input function 1 in the first embodiment except that the structure of a display panel with pressure sensor 10C is different from that of the display panel with pressure sensor 10 in the first embodiment. Thus, only the difference between the display panel with pressure sensor 10C and the display panel with pressure sensor 10 in the first embodiment will be specifically described below. FIG. 7 is a sectional view illustrating the display panel with pressure sensor in accordance with the fourth embodiment of the present invention.

The display panel with pressure sensor 10C in this embodiment includes a pressure sensor 20C. The pressure sensor 20C includes a piezoelectric film 201.

A piezoelectric detection electrode 202P and a capacitance detecting electrode 202D are formed on a first flat plate face of the piezoelectric film 201. The piezoelectric detection electrode 202P and the capacitance detecting electrode 202D are formed in a predetermined pattern. The piezoelectric detection electrode 202P and the capacitance detecting electrode 202D are formed so as not to be electrically connected to each other.

A piezoelectric detection electrode 203P and a capacitance detecting electrode 203D are formed on a second flat plate face of the piezoelectric film 201. The piezoelectric detection electrode 203P and the capacitance detecting electrode 203D are formed in a predetermined pattern. The piezoelectric detection electrode 203P and the capacitance detecting electrode 203D are formed so as not to be electrically connected to each other.

The piezoelectric detection electrodes 202P, 203P are shaped to be capable of detecting a voltage generated by bending of the piezoelectric film 201. The capacitance detecting electrodes 202D, 203D are shaped to be capable of detecting a capacitance change generated from the operation of the operation surface by the operator.

The piezoelectric detection electrodes 202P, 203P, and the capacitance detecting electrodes 202D, 203D are made of a translucent material.

With such configuration, the pressure sensor 20B using the single piezoelectric film 201 can detect the pressing amount and the operational position.

With such configuration, as in each of the embodiments, a desired color displayed in the display panel can be offered to the operator. Further, the display panel with pressure sensor and the electronic device with pressing input function, which are capable of detecting the pressing amount and the operational position, can be made thinner.

Although the two piezoelectric films are stacked in each of the embodiments, four or more even number of piezoelectric films may be stacked. In this case, the drawing directions of the two piezoelectric films that form a pair are orthogonal to each other. FIG. 8 is a view illustrating relationship between the drawing directions in the state where the four piezoelectric films are stacked (overlapped). Drawing directions 901, 904 of the two piezoelectric films as a first pair are orthogonal to each other. Drawing directions 911, 912 of the two piezoelectric films as a second pair are orthogonal to each other. Such configuration can cancel the effect of birefringence of the single piezoelectric film.

Although the reflection-type display panel is used in each of the embodiments, the present invention can be applied to a transmission display panel in which the liquid crystal panel is sandwiched between the front polarizing plate and the rear polarizing plate. In this case, a plurality of films having birefringence may be disposed between the front polarizing plate and the liquid crystal panel, or between the liquid crystal panel and the rear polarizing plate. With such configuration, as in the embodiments, a desired color displayed in the display panel can be offered to the operator.

Although PLA, PLLA are used as the chiral polymer forming the piezoelectric film in each of the embodiments, the above-mentioned configuration can also be applied when the piezoelectric film having birefringence, such as PDLA, is used.

REFERENCE SIGNS LIST 1, 1A, 1B, 1C electronic device with pressing input function
10, 10A, 10B, 10C display panel with pressure sensor
20, 20C pressure sensor
30 display panel
40 protective member
50 housing
60 arithmetic circuit module
70 position detecting sensor
201 piezoelectric film
202, 203 electrode
204 piezoelectric film
202P, 203P piezoelectric detection electrode
202D, 203D capacitance detecting electrode
210, 270 intermediate member
301 liquid crystal panel
302 front polarizing plate 303 rear reflective plate
701 insulating substrate
702, 703 electrode

The invention claimed is:

1. A display comprising:
a display panel including an image forming panel that controls light emitted to a front face side thereof to form a displayed image, and a polarizing plate disposed at the front face side of the image forming panel;
a pressure sensor having a piezoelectric film formed of a first at least uniaxially drawn polylactic acid;
a flexible buffer member between the pressure sensor and the image forming panel, and directly adjacent the front face side of the image forming panel; and
a phase compensating film adjacent the pressure sensor, the phase compensating film formed of a second at least uniaxially drawn polylactic acid, wherein
both the pressure sensor and the phase compensating film are disposed between the mage forming panel and the polarizing plate,
a first uniaxial drawing direction of the piezoelectric film is orthogonal to a second uniaxial drawing direction of the phase compensating film, and
an angle between the first uniaxial drawing direction of the piezoelectric film and the second uniaxial drawing direction of the phase compensating film cancels an effect of birefringence on the light wave penetrating the piezoelectric film and the phase compensating film.

2. The display according to claim 1, wherein the phase compensating film is adjacent the image forming panel.

3. The display according to claim 1, wherein the phase compensating film has a first phase difference opposite to a second phase difference of the piezoelectric film.

4. The display according to claim 1, further comprising:
first and second electrodes on opposed sides of the phase compensating film, and wherein the phase compensating film has a pressure-detecting function in conjunction with the first and second electrodes.

5. The display according to claim 1, further comprising:
first and second electrodes on opposed sides of the phase compensating film, and wherein the phase compensating film has a position-detecting sensor function in conjunction with the first and second electrodes.

6. The display according to claim 1, further comprising:
first and second capacitance electrodes on opposed sides of the piezoelectric film of the pressure sensor, and wherein the piezoelectric film has a pressure-detecting function in conjunction with the first and second electrodes.

7. An electronic device comprising:
the display according to claim 1;
an arithmetic circuit that determines a pressing amount based on a detection signal from the pressure sensor; and
a housing having a display surface, the housing accommodating the display and the arithmetic unit.

8. An electronic device comprising:
the display according to claim 4;
an arithmetic circuit that determines a pressing amount based on a detection signal from the pressure sensor and the phase compensating film; and
a housing having a display surface, the housing accommodating the display and the arithmetic unit.

9. An electronic device comprising:
the display according to claim 5;
an arithmetic circuit that determines a pressing amount based on a detection signal from the pressure sensor and a pressing location based on a detection signal from the phase compensating film; and
a housing having a display surface, the housing accommodating the display and the arithmetic unit.

10. An electronic device comprising:
the display according to claim 6;
an arithmetic circuit that determines a pressing amount based on a detection signal from the pressure sensor and a pressing location based on a capacitance signal from the pressure sensor; and
a housing having a display surface, the housing accommodating the display and the arithmetic unit.

* * * * *